United States Patent
Rolong et al.

(10) Patent No.: US 11,644,957 B2
(45) Date of Patent: May 9, 2023

(54) AUTOMATED DISPLAY OF WELLBORE INFORMATION

(71) Applicant: Nabors Drilling Technologies USA, Inc., Houston, TX (US)

(72) Inventors: Carlos Rolong, Spring, TX (US); Ryan Bott, Houston, TX (US); Mohammad Hamzah, Katy, TX (US); Chandana Koritala, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 0 days.

(21) Appl. No.: 17/343,266

(22) Filed: Jun. 9, 2021

(65) Prior Publication Data

US 2021/0389855 A1 Dec. 16, 2021

Related U.S. Application Data (60) Provisional application No. 63/039,229, filed on Jun. 15, 2020.

(51) Int. Cl.
| | | |
|---|---|---|
| *G06F 3/14* | (2006.01) | |
| *G06F 3/0484* | (2022.01) | |
| *E21B 47/00* | (2012.01) | |

(52) U.S. Cl.
CPC ............ *G06F 3/0484* (2013.01); *E21B 47/00* (2013.01); *G06F 3/14* (2013.01)

(58) Field of Classification Search
CPC ........... G06F 3/0484; G06F 3/14; E21B 47/00
See application file for complete search history.

(56) References Cited

U.S. PATENT DOCUMENTS

| | | | |
|---|---|---|---|
| 8,705,318 B2 | 4/2014 | Zheng et al. | |
| 9,070,172 B2 | 6/2015 | Broussard et al. | |
| 9,309,747 B2 | 4/2016 | Dankers et al. | |
| 10,579,231 B1 | 3/2020 | Valleru et al. | |
| 10,626,714 B2 | 4/2020 | Foubert et al. | |
| 2006/0136830 A1* | 6/2006 | Martlage | G06F 40/174 378/162 |
| 2009/0152005 A1* | 6/2009 | Chapman | E21B 44/00 702/9 |
| 2011/0161133 A1 | 6/2011 | Staveley et al. | |
| 2012/0215664 A1* | 8/2012 | Dalal | G06Q 30/06 706/12 |
| 2013/0186687 A1* | 7/2013 | Snyder | E21B 7/04 175/40 |
| 2015/0295914 A1* | 10/2015 | Kelishadi | G06F 21/31 715/745 |
| 2018/0334887 A1 | 11/2018 | Dashevskiy et al. | |
| 2020/0125225 A1* | 4/2020 | Bettles | G06N 20/00 |

FOREIGN PATENT DOCUMENTS

| | | |
|---|---|---|
| WO | 2014/160561 A1 | 10/2014 |
| WO | 2017/105849 A1 | 6/2017 |

* cited by examiner

*Primary Examiner* — Rinna Yi
(74) *Attorney, Agent, or Firm* — Abel Schillinger, LLP (57) ABSTRACT

A method is provided that can include collecting, via a processor, operational data about a subterranean operation being performed on a rig, determining, via the processor, a type of the subterranean operation based on the operational data, and automatically updating, based on the type, a user display with display elements associated with the subterranean operation.

16 Claims, 10 Drawing Sheets

AUTOMATED DISPLAY OF WELLBORE INFORMATION

CROSS REFERENCE TO RELATED APPLICATION(S)

This application claims priority under 35 U.S.C. § 119(e) to U.S. Provisional Application No. 63/039,229, entitled "AUTOMATED DISPLAY OF WELLBORE INFORMATION," by Carlos ROLONG et al., filed Jun. 15, 2020, which application is assigned to the current assignee hereof and incorporated herein by reference in its entirety.

TECHNICAL FIELD

The present invention relates, in general, to the field of drilling and processing of wells. More particularly, present embodiments relate to a system and method of automatically configuring displays to show contextual information when a subterranean operation changes on a rig.

BACKGROUND

During subterranean operations, such as drilling, casing, cementing, fracking, etc., there can be preferred information a user (e.g., driller, company man, roughneck, etc.) may wish to monitor while the subterranean operation continues while other information may not need to be monitored (i.e., non-preferred information) during the execution of the subterranean operation. Therefore, the user can organize content for viewing on display(s) to monitor the preferred information for the subterranean operation, while minimizing viewing of non-preferred information on the display(s). Even with two or more displays, the viewing space on the displays can be limited and the user may want to organize the content being displayed on the displays to at least display the preferred information and not display non-preferred information unless of course there is available space on the displays after the preferred information is displayed.

It should be understood that the preferred information is the information that the user desires to view on the displays during the subterranean operation that is specifically relevant to the subterranean operation. A first user may prefer to display items A, B, and C during the subterranean operation, while a second user may prefer to display items A, b, and D for the same subterranean operation. Therefore, the preferred information can be different for each user, as well as possibly being different for each subterranean operation. The non-preferred information, as used herein, refers to the information that is not included in the preferred information. Therefore, the non-preferred information can also be different for each user, as well as possibly being different for each subterranean operation.

The preferred information for a subterranean operation can be displayed on a user's display, but it may require the user to navigate between display screens and menus to select or view the preferred information. The preferred information may include information from different widgets at different navigation points in a rig controller program. Therefore, a user may need to navigate to different screens and menus via the display and user input devices (e.g., keyboard, mouse, touchscreen, voice control input, laser pointer, etc.) to display all or a portion of the widgets associated with the preferred information. A widget as used herein is a graphical user interface GUI with an associated software program that manages the collection and display of the particular information related to the widget. As used herein, a software program refers to a processor (e.g., microprocessor, computer, logic array, gate array, etc.) that can receive instructions from a memory storage (e.g., a non-transitory memory storage) and can execute those instructions to control collection and display of preferred or non-preferred information.

During the subterranean operation, the user may need to navigate repeatedly between separate widgets to monitor the preferred information. This continued navigation takes up valuable time and can sometimes cause the information to be missed during navigation between widgets (or display elements 200 as shown below). Therefore, improvements in the art of displaying preferred information during a subterranean operation are continually needed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by the data processing apparatus, cause the apparatus to perform the actions. One general aspect includes a method for conducting subterranean operations. The method also includes collecting, via a processor, operational data about a subterranean operation being performed on a rig; determining, via the processor, a type of the subterranean operation based on the operational data; and automatically updating, based on the type, a user display with display elements associated with the subterranean operation. Other embodiments of this aspect include corresponding computer systems, apparatus, and computer programs recorded on one or more computer storage devices, each configured to perform the actions of the methods.

One general aspect includes a method for conducting subterranean operations. The method also includes collecting, via a processor, operational data about subterranean operations being performed for one or more wellbores on one or more rigs; determining, via the processor, a type of each of the subterranean operations based on the operational data; and automatically updating, based on the type of each of the subterranean operations, a user display with a high-level view of display elements for a subset of the one or more wellbores. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," "generally," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "tubular" refers to an elongated cylindrical tube and can include any of the tubulars manipulated around a rig, such as tubular segments, tubular stands, tubulars, and tubular string. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

Figure 1:
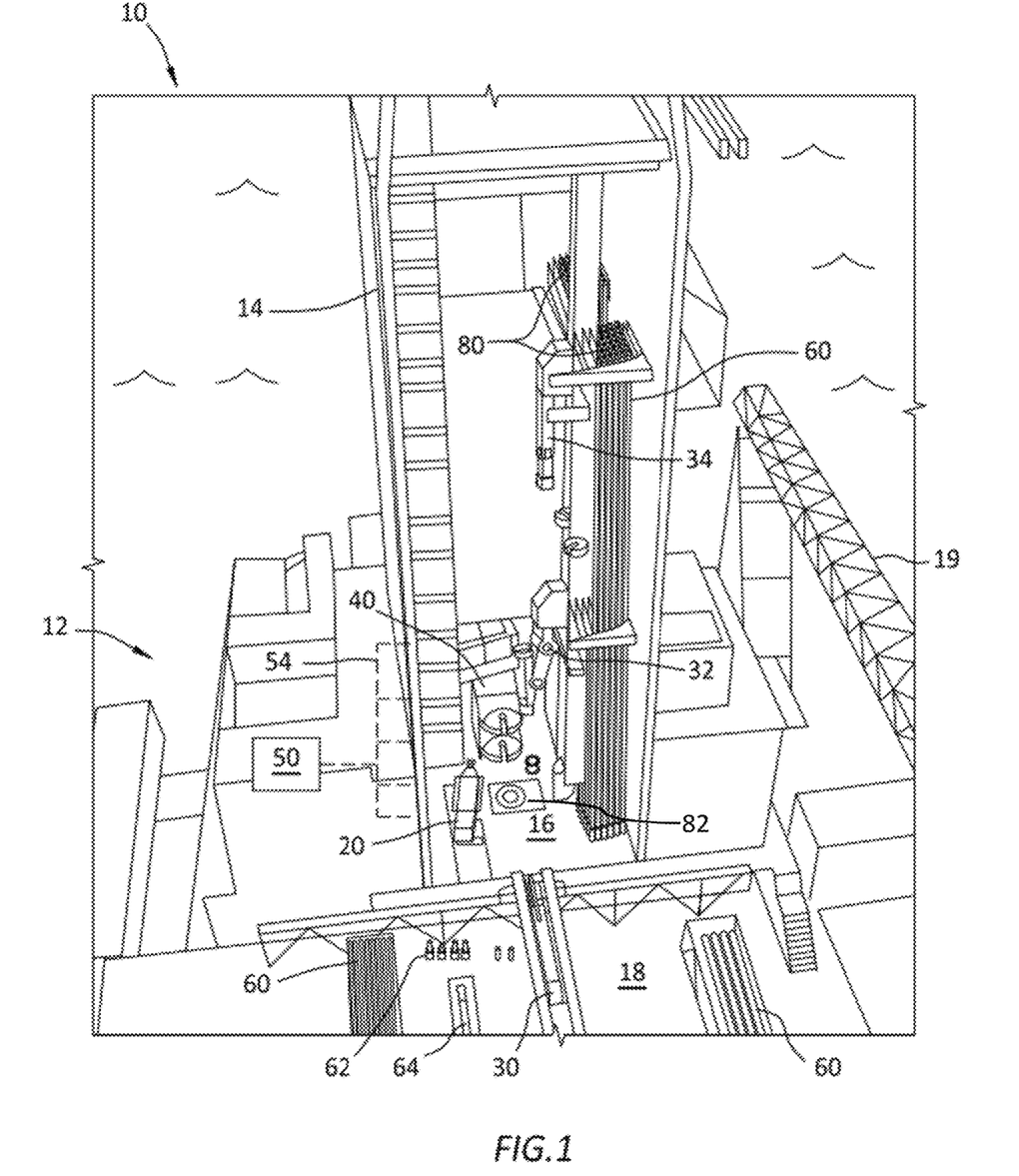
FIG. 1 is a representative view of a rig used to perform subterranean operations, in accordance with certain embodiments.

FIG. 1 is a representative view of a rig 10 that can be used to perform subterranean operations. The rig 10 is shown as an offshore rig, but it should be understood that the principles of this disclosure are equally applicable to onshore rigs as well. The example rig 10 can include a platform 12 with a derrick 14 extending above the platform 12 from the rig floor 16. The platform 12 and derrick 14 provide the general superstructure of the rig 10 from which the rig equipment is supported. The rig 10 can include a horizontal storage area 18, fingerboards 80, pipe handlers 30, 32, 34, a drill floor robot 20, an iron roughneck 40, and a crane 19. The equipment on the rig 10, can be communicatively coupled to a rig controller 50 via a network 54, with the network 54 being wired or wirelessly connected to the equipment and other rig resources.

It should be understood that the rig controller 50 can include one or more processors and non-transitory memory storage that can store data and executable instructions, where the one or more processors are configured to execute the executable instructions to execute one or more software programs. The rig controller 50 can also include one or more graphical user interfaces (GUIs), one or more input devices, one or more displays, one or more peripherals (such as external storage, a printer, etc.), and one or more communication links to a remote location. As used herein, "display" can include one or more displays, where the displays can be local to the rig (such as in the rig control room) or remote, such as outside the rig control room (e.g., office space on the rig, remote location off the rig, etc.), and where the displays can be desktop computer monitors, laptop screens, touchscreens, handheld devices (smartphones, tablets, etc.), heads-up displays, or wearable displays (e.g., smart eyeglasses, VR displays, smartwatches, etc.).

The rig controller 50 can automatically update which display elements 200 (see FIG. 3) are viewable on the display 70. The display elements 200 are visualization outputs (such as GUIs) driven by one or more software applications, the visualization outputs being viewable on the display 70. For example, the visualizations can be graphical representations (e.g., widgets that display strip chart plots, histogram plots, information tables, animation of information, graphical representation of information, etc.), dynamically updated graphics (e.g., RPM indicator, rate of penetration ROP indicator, depth indicator, drill string position, etc.), or any other way to visualize the historical data or real-time data on the display 70.

Some of the equipment that can be used during subterranean operations is shown in the horizontal storage area 18 and the fingerboards 80, such as the tubulars 60, the tools 62, and the bottom hole assembly (BHA) 64. The tubulars 60 can include drilling tubular segments, casing tubular segments, and tubular stands that are made up of multiple tubular segments. The tools 62 can include centralizers, subs, slips, subs with sensors, adapters, etc. The BHA 64 can include drill collars, instrumentation (e.g., logging tools and other sensors), and a drill bit.

The rig controller 50 can also include processors distributed in various rig equipment for local control, distributed about the rig 10, distributed downhole in a wellbore, distributed below the rig, or distributed to remote locations that are not on the rig. Each processor can include non-transitory memory storage that can store data and executable instructions. The rig controller 50 can control and collect information from local sensors (e.g., distributed around the rig), remote sensors (e.g., downhole sensors, such as in the BHA), downhole telemetry, tour sheets, rig and wellbore reports, activity reports, drilling plans, well plans, user inputs, and calculations from processors that produce a result based on sensor data or historical data.

As used herein, "historical data" refers to any information recorded from sensors, or information received from vendors, manufacturers, contractors, rig personnel, remote personnel regarding rig operations, or any information stored by the rig controller for later evaluation or reporting. As used herein, "real-time data" refers to data that is consumed or displayed within 60 seconds from when the data is collected. The historical data and real-time data can overlap, where all real-time data is also historical data, but not all historical data is real-time data. As used herein, "operational data" or "operational information" refers to historical data or real-time data.

Figure 2:
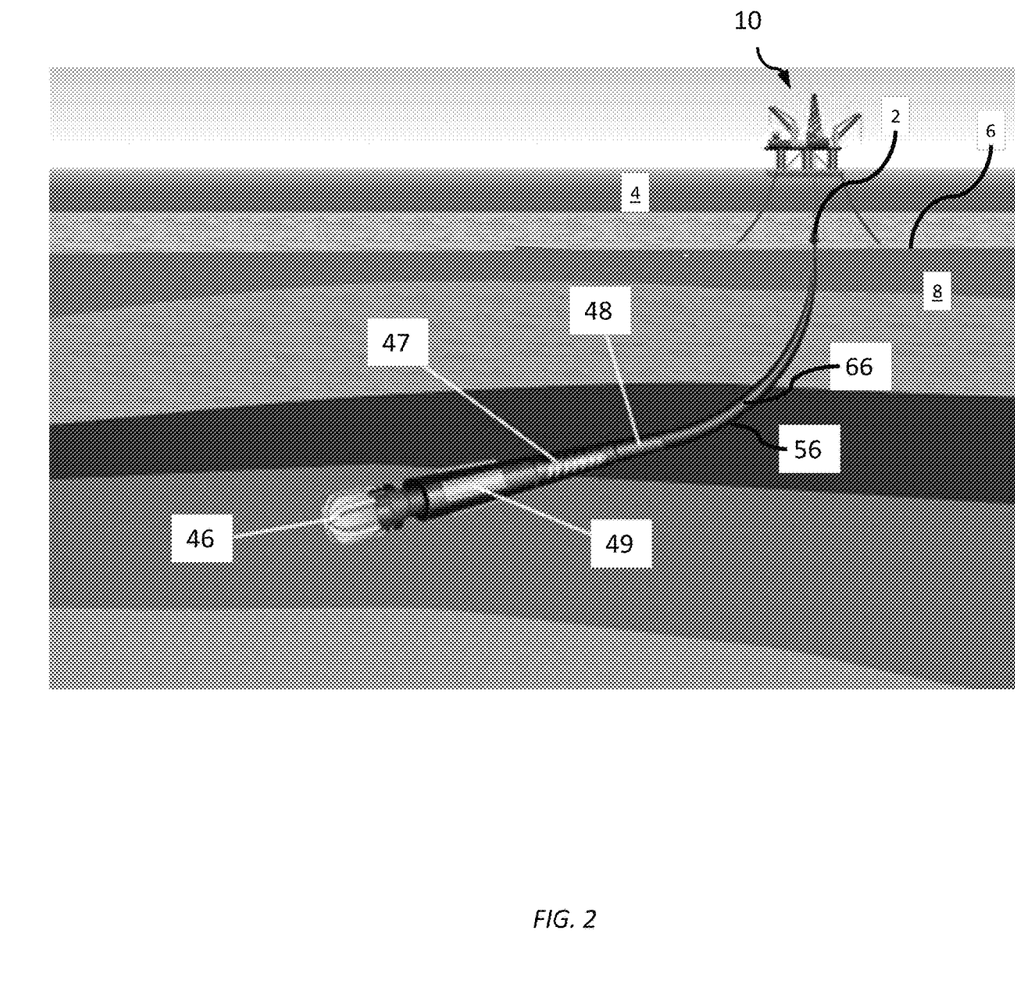
FIG. 2 is a representative partial cross-section view of a wellbore being drilled in an earthen formation, in accordance with certain embodiments.

FIG. 2 is a representative partial cross-section view of a subterranean operation of drilling a wellbore 56 in an earthen formation 8 from the rig 10. This example illustrates an offshore rig 10 with a riser string that connects from the rig 10 to the wellhead 2 at the surface 6 of the earthen formation 8. However, the rig can also be an onshore rig 10, which may not require a riser string. The drill string 66 can be used to extend the wellbore 56 into the earthen formation. The drill bit 46 cuts through the earthen formation 8, while drilling mud circulates to remove the cuttings from the wellbore. The direction of the drill bit 46 can be controlled by a directional drilling sub 49 that can be used to divert the drill bit 46 in a desired direction. The drill bit 46 can be rotated by rotating the drill string 66 via the rig 10 (i.e., rotary drilling), or the drill bit 46 can be rotated by a mud motor 47 (i.e., slide drilling). A logging tool 48 can be used to collect and report valuable information about the earthen formation, wellbore conditions, wellbore orientation, drill string orientation, etc.

The rig 10 can perform various subterranean operations during the process of producing hydrocarbons from reservoirs in the earthen formation 8. During these operations, some information that users (e.g., operators, drillers, managers, remote personnel, office personnel, etc.) need to monitor and control these operations can be seen on their displays. The needed information (or preferred information) can vary greatly as the subterranean operations change (e.g., from drilling to tripping and back to drilling). The needed information (or preferred information) can also vary between types of users for the same operation. What one user desires to see on their screen may differ from what another user desires to see on another screen (or display). For example, drillers may prefer to monitor the rate of penetration of the drill string, rotation of the drill string, bottom hole pressure, direction of the drill string, etc., while the managers may prefer to see tour reports, personnel assignments, the current depth of wellbore, etc. Additionally, when the subterranean operation changes from drilling to tripping the drill string out of the wellbore, the visualization preferences for each person associated with the rig and its operations may need to change to monitor or control the appropriate activities being performed for the new operation. For example, the rate of penetration may no longer be pertinent information for the driller, when the drill string is being tripped out of the wellbore.

The current disclosure provides a visualization method and system that does not require the user to determine what operation is being performed on the rig or to navigate to the data visualizations associated with that operation. The current disclosure provides a visualization method and system that can automatically update the display elements viewed by a particular user, which minimizes a risk of missing key information relevant to the active operation. This can greatly benefit the efficient operation of the rig by avoiding visualization of irrelevant information on the user display 70 for the current operation which can mislead the personnel regarding what operation is currently taking place on the rig. As described in more detail below, automating the presentation of the relevant information for the current operation to the user enables the user to make quicker and safer decisions by reducing the need to navigate through numerous display elements, which can be presented across multiple visualizations and displays elements, and removing the irrelevant information from the user display 70.

Figure 3:
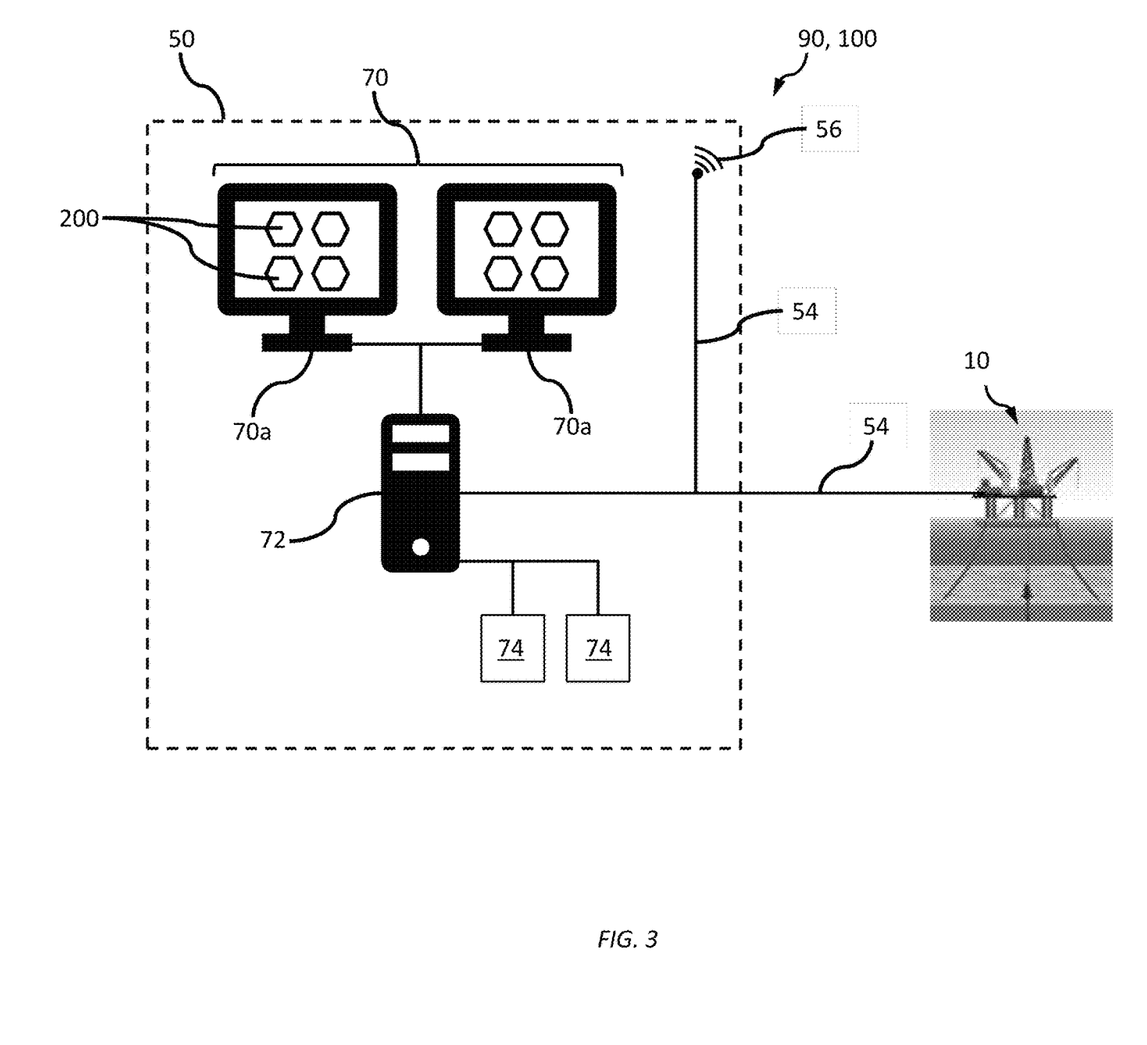
FIG. 3 is a representative functional block diagram of a rig controller for a rig, in accordance with certain embodiments.

FIG. 3 is a representative functional block diagram of a rig controller 50 for a rig 10. As stated above, the rig controller 50 can include one or more processors 72 and non-transitory memory storage (e.g., internal or external storage) that can store data and executable instructions. The one or more processors 72 can have peripherals 74 (e.g., printers, scanners, external non-transitory memory storage, plotters, rig alarms, etc.) connected via a wired or wireless communications network 54. The one or more processors 72 can be configured to execute the executable instructions and perform the method of the rig control systems 90, 100.

The rig controller 50 can include a display 70 that may include one or more displays 70a, 70b that can be electronically coupled with the one or more processors 72 such that the display 70 can receive and visualize display elements 200. The display 70 can also receive user input via user interaction with the display 70 (e.g., touch screen, cursor selected items, etc.) and transmit the user input information to the one or more processors 72 for analysis and action. The one or more processors 72 can be linked to both local and remote processors via the wireless transceiver 56 that can be connected to a wired network forming communications network 54.

The one or more processors 72 can receive information from local sensors (e.g., distributed around the rig), remote sensors (e.g., downhole sensors, such as in the BHA), downhole telemetry, tour sheets, rig and wellbore reports, activity reports, drilling plans, well plans, user inputs, and calculations from processors that produce a result based on sensor data or historical data. The one or more processors 72 can process the received information and provide visualization based on the received information by updating the display elements 200 for viewing on the display 70.

Figure 4:
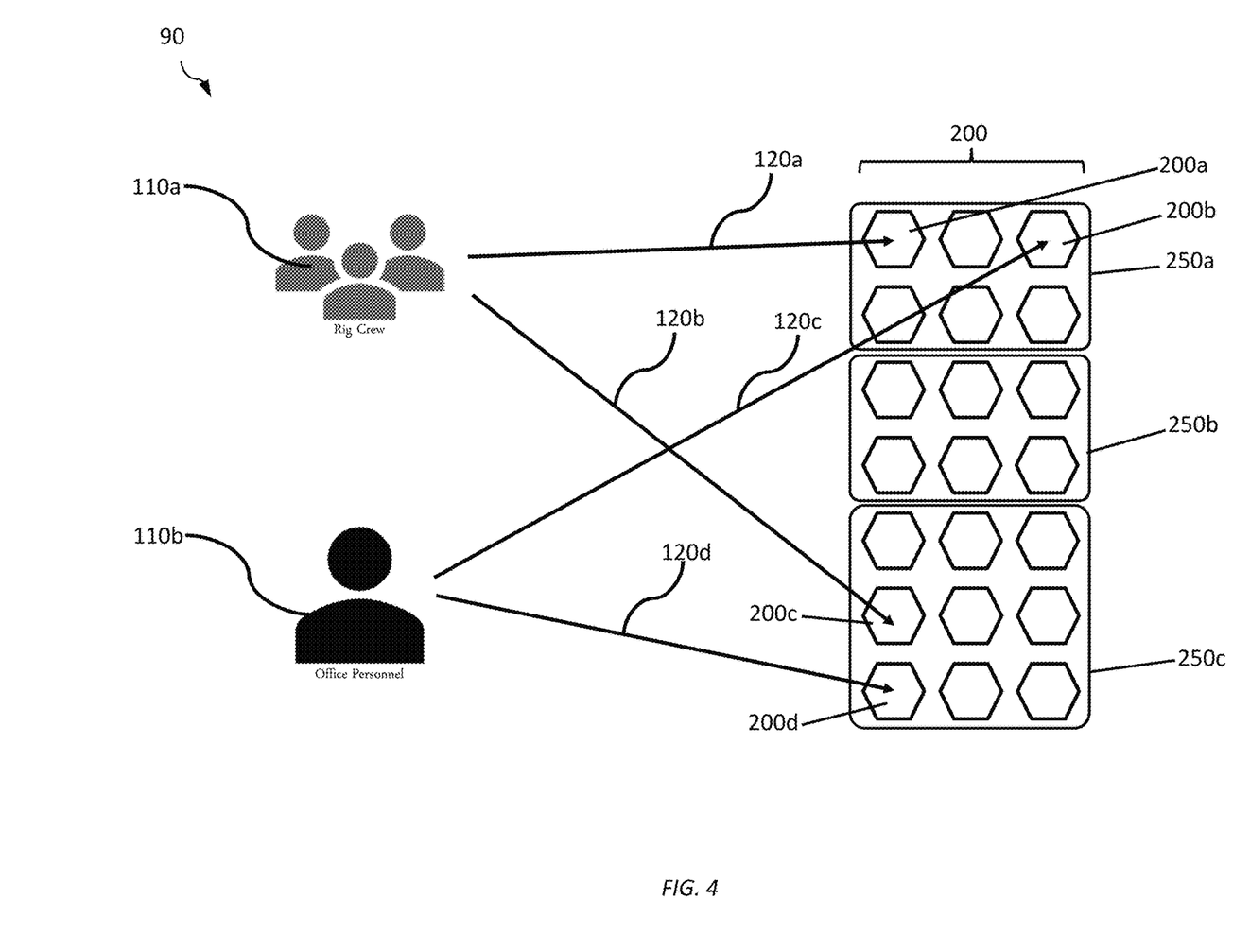
FIGS. 4-5 are graphical representations of a rig control system used to control visualization of rig information for subterranean operations, in accordance with certain embodiments.
Figure 5:
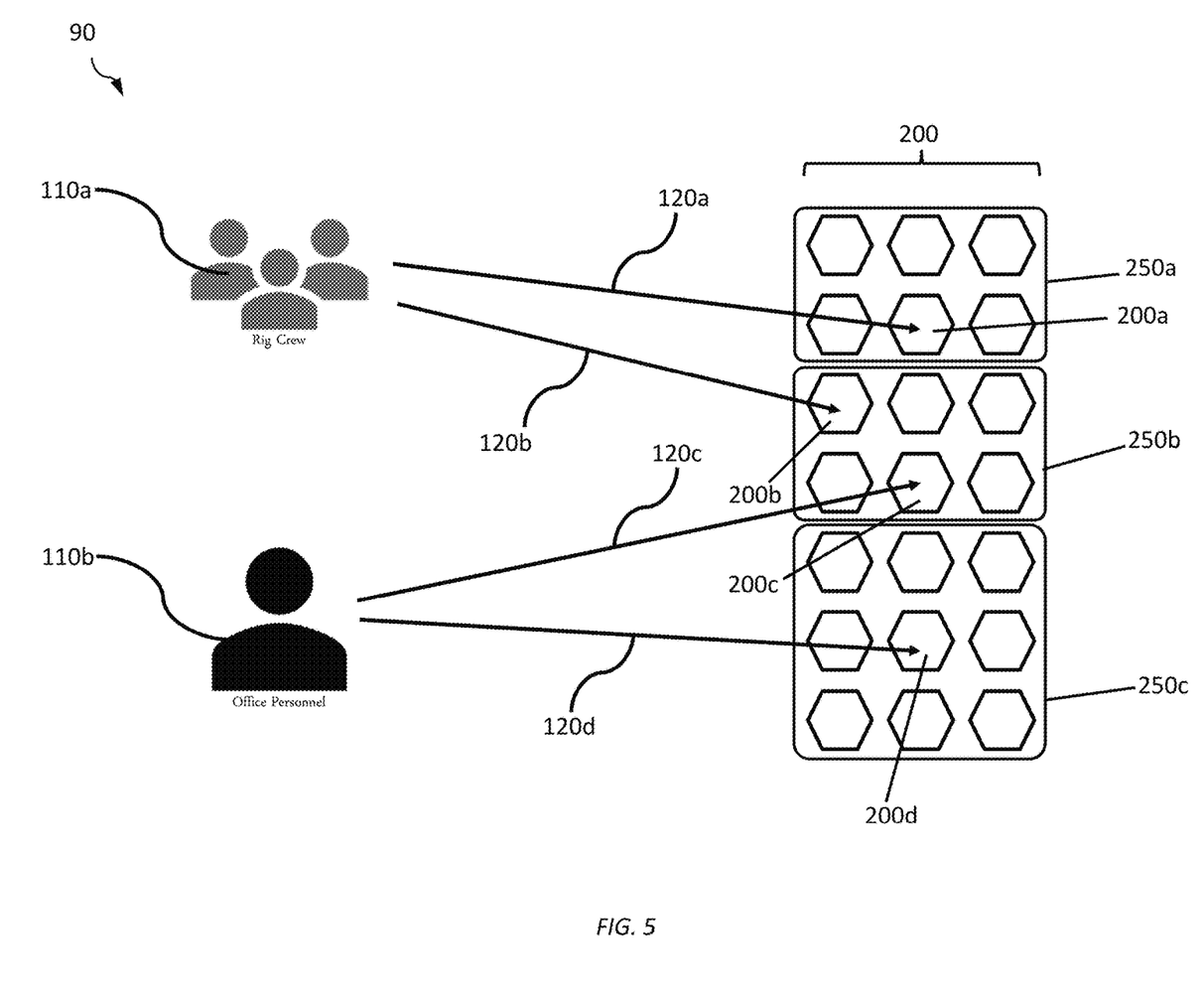

FIGS. 4-5 are graphical representations of a rig control system 90 which can be used to control visualization of rig information regarding subterranean operations. The users (e.g., rig crew, office personnel, etc.) can determine what operation the rig 10 is currently performing based on, for example, a well plan or display elements shown on the display 70. To determine the operation currently being performed by the rig 10, the user may need to navigate through various menus, screens, links, etc., to navigate to one or more display elements 200 that can provide the information to make an accurate decision about the current operation. After the user determines what operation is being performed, the user may continually need to navigate through various menus, screens, links, etc., to navigate to one or more display elements 200 that provide the needed updates for information related to the current operation. Unfortunately, it may be a case where the display elements 200 that need to be monitored are on different application windows 250a-c (where the windows may include visualization of one or more display elements 200). In this case, the user may have to navigate (via shortcut links, menu lists, screens, and other links) to alternate between the different application windows 250a-c to monitor the desired display elements 200. As mentioned above, different users may desire to view different display elements 200 for the current operation of the rig 10. Therefore, the grouping of display elements 200 for application windows 250a-c can be great for one user, but cause another user to repeatedly have to navigate away from the windows to locate other display elements 200.

FIG. 4 represents a rig control system 90 with two examples where one or more of the rig crew 110a, based on the current rig 10 operation, desires to view the display elements 200a, 200c, and where one or more of the office personnel 110b, based on the current rig 10 operation, desires to view the display elements 200b, 200d. It should be understood that the rig crew 110a and the office personnel 110b may want to view the same display elements 200. They are not required to view different display elements. This example merely highlights that the desired display elements for the rig crew 110a and the office personnel 110b can be different.

Since, in this example, the display elements 200a, 200c are located on different application windows 250a-c, the rig crew 110a may need to repeatedly (or continually) navigate between display elements 200a, 200c, and application windows 250a, 250c to keep up to date on the rig operation. The office personnel 110b may also need to repeatedly (or continually) navigate between display elements 200b, 200d, and application windows 250a, 250c to keep up to date on the rig operation. If the rig crew 110a fails to be aware of the changing information in the display elements 200a, 200c, (e.g., by remaining in one application window 250a-c too long, or any changed information on the unviewed display elements 200a, 200c goes unnoticed) then critical decisions can be delayed or missed altogether. Depending upon the changing information, the time it takes to navigate to the unviewed display elements 200a, 200c can be a critical time for decision making that is lost. Similarly, if the office personnel 110b fails to be aware of the changing information in the unviewed display elements 200a, 200c, then the office personnel may fail to recognize that the rig operation has changed. The arrows 120a-d indicate display requests made by the user 110a, 110b to navigate to the desired display element 200a-d.

FIG. 5 represents a rig control system 90 with two other examples where one or more of the rig crew 110a, based on the current rig 10 operation, desires to view the display elements 200a, 200b, and where one or more of the office personnel 110b, based on the current rig 10 operation, desires to view the display elements 200c, 200d. As the rig operations change, the desired display elements 200 to be viewed may also change.

Both of the examples given in FIGS. 4-5 are constrained by the navigation paths established when the configuration of the display elements 200 on various application windows (e.g., application windows 250a-c) are set when the rig operations begin. Even if the user modifies the groupings of the display elements 200 to minimize navigation paths for one rig operation, the user usually remains constrained to the new navigation paths 120a-d. Even the newly established navigation paths 120a-d can provide cumbersome navigation to desired display elements 200 when the rig operations change.

The rig control system 100 of the current disclosure can eliminate (or greatly reduce) any cumbersome navigation to viewing desired display elements. This is described in more detail regarding FIGS. 6-10.

Figure 6:
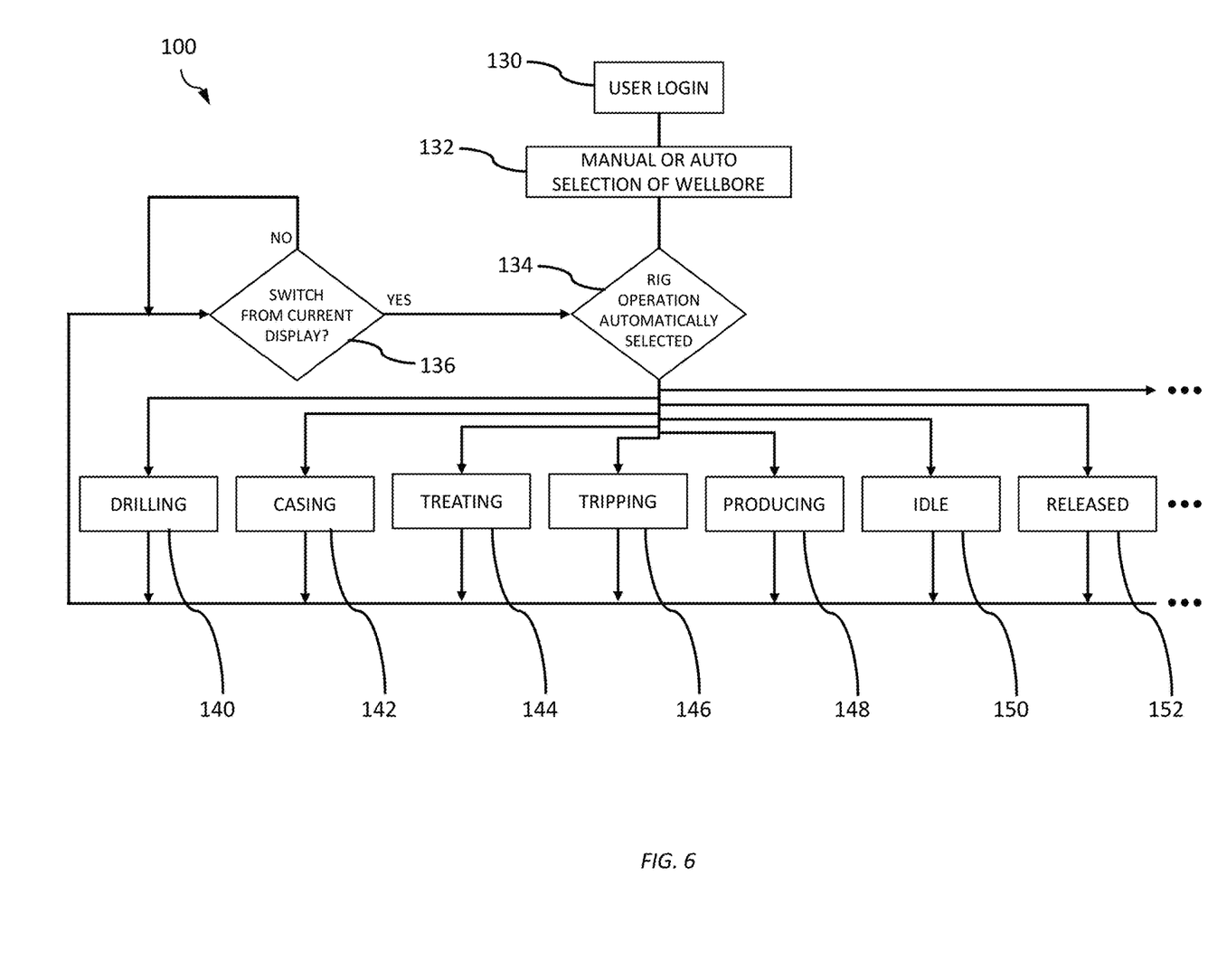
FIG. 6 is a representative functional block diagram of representative operations of a rig control system that automatically updates visualization of rig information for subterranean operations, in accordance with certain embodiments.

FIG. 6 is a representative functional block diagram of representative operations of a rig control system 100 that automatically updates visualization via a display 70 of rig information to a user for subterranean operations, in accordance with certain embodiments. A user (110a, 110b) can log in (operation 130) to the rig control system 100 (being executed on the rig controller 50) via an access point, such as a computer, smartphone, tablet, wearable device, etc. When the user logs in (operation 130), the rig control system 100 can automatically select a desired wellbore to monitor, or the user can have an option to manually select a desired wellbore (operation 132). Once the desired wellbore is selected in operation 132, then the rig control system 100 can automatically select which rig operation is being performed on the wellbore (operation 134) based on the historical or real-time data.

Using various operational data acquired from various data sources, the rig control system 100 can be used to identify the current rig operation or activities for the desired wellbore. Based on the identified rig and rig operation, a pre-determined set of display elements 200, that are associated with the rig, the rig operation, and the type of user, can be automatically presented to the user via the display 70. The predetermined group of display elements 200 that are needed to drive decisions by the user regarding the rig operation can be associated with the user type and the rig operation being monitored. For example, a driller monitoring a drilling operation may need display elements 200 visualized via the display 70 for communicating the ROP for the drill string, RPM of the drill bit, depth of the wellbore, system pressures, and many other parameters to monitor and control. However, the driller monitoring a rig operation of tripping the drill string may need other display elements 200 visualized via the display 70 for communicating the necessary information to the user related to tripping.

The rig operation can include drilling (operation 140), casing (operation 142), treating (operation 144), tripping (operation 146), producing (operation 148), idle (operation 150), released (operation 152), as well as many other operations known to those skilled in the art. The rig operation can also indicate sub-operations to the operations 140-152. For example, the rig operation can indicate sub-operations of drilling, such as rotary drilling, slide drilling, vertical rotary drilling, deviated rotary drilling, vertical slide drilling, deviated slide drilling, etc., with each sub-operation having an associated pre-determined group of display elements 200 for presenting the preferred information to the user via the display 70. The rig control system 100 can also allow the user to further "drill down" into the rig operation by enabling navigation to the sub-operations to view additional contextual display elements 200 of greater granularity for sub-categorizations of the operation as well as different aspects of the operation, such as performance, wellbore quality, hole condition, safety, etc.

The rig control system 100 can continually analyze the operational data (e.g., historical or real-time data) to determine the current rig operation of the desired wellbore. When the rig control system 100 determines that the rig operation is changing or has changed, the rig control system 100 can automatically switch from the current display elements 200 to the pre-determined display elements 200. However, the rig control system 100 can also allow the user to override this automatic switching (operation 136) by requesting input from the user to accept the change or stay on the current rig operation, even though, the rig operation has changed on the desired rig. This can allow the user to complete his current tasking as related to the display elements 200 associated with the previous rig operation. The rig control system 100 can provide an indication to the user that the display elements 200 currently being shown on the display 70 are not the pre-determined group of display elements 200 associated with the new rig operation and provide a mechanism to allow the user to accept switching to the new rig operation when the user is ready.

Some of the rig operations can be states of the wellbore, such as idle (operation 150) which can indicate that the wellbore is currently idle and no rig operation is currently being performed, but that it is planned to return the rig 10 to the wellbore for additional rig operations. The released (operation 152) rig operation can indicate that the rig 10 may not be returning to the wellbore for additional operations.

By automatically updating the display elements 200 on the display 70 when the rig operation changes, the updated display elements 200 can provide visualization of the preferred information for the new rig operation, without the need for the user to select the desired display elements 200. This can help minimize problems caused by the cumbersome navigation through different application windows 250*a-c*, or if the user fails to recognize the rig operation has changed.

The initial group of display elements 200 that are displayed on the display 70 after a new rig operation is detected, a user can independently select one or more display elements 200 that are not included in the initial group of display elements 200 and add the one or more display elements 200 to the initial group and displaying the one or more display elements 200 along with the initial group of display elements 200 on the display 70. The user can update the initial group of display elements 200 to include the one or more display elements 200, such that when the rig operation is detected again, the one or more display elements 200 are automatically included in the initial group of display elements 200 that are automatically displayed after the rig operation is detected.

Figure 7:
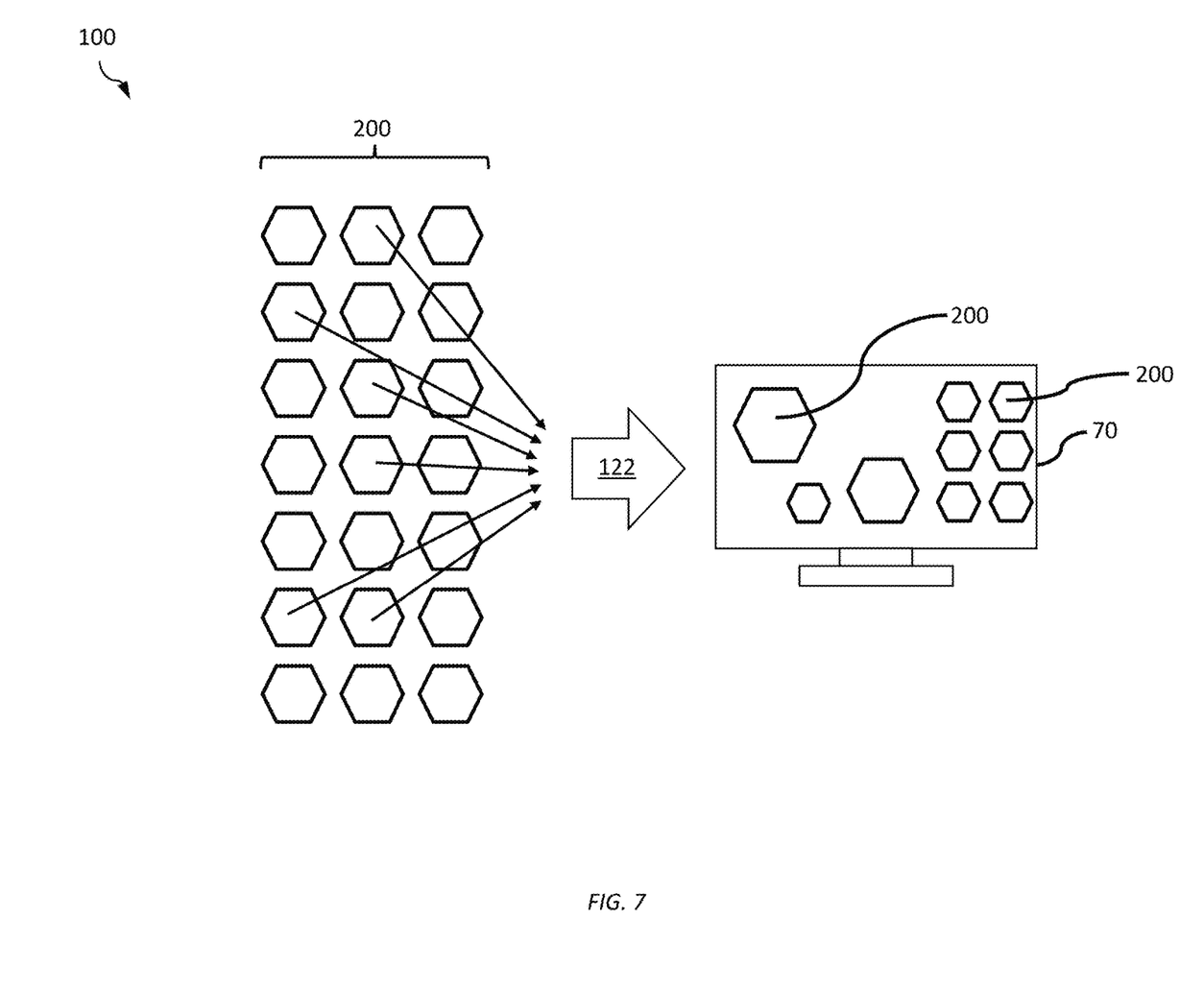
FIGS. 7-9 are graphical representations of a rig control system that automatically updates visualization of rig information for subterranean operations, in accordance with certain embodiments.
Figure 8:
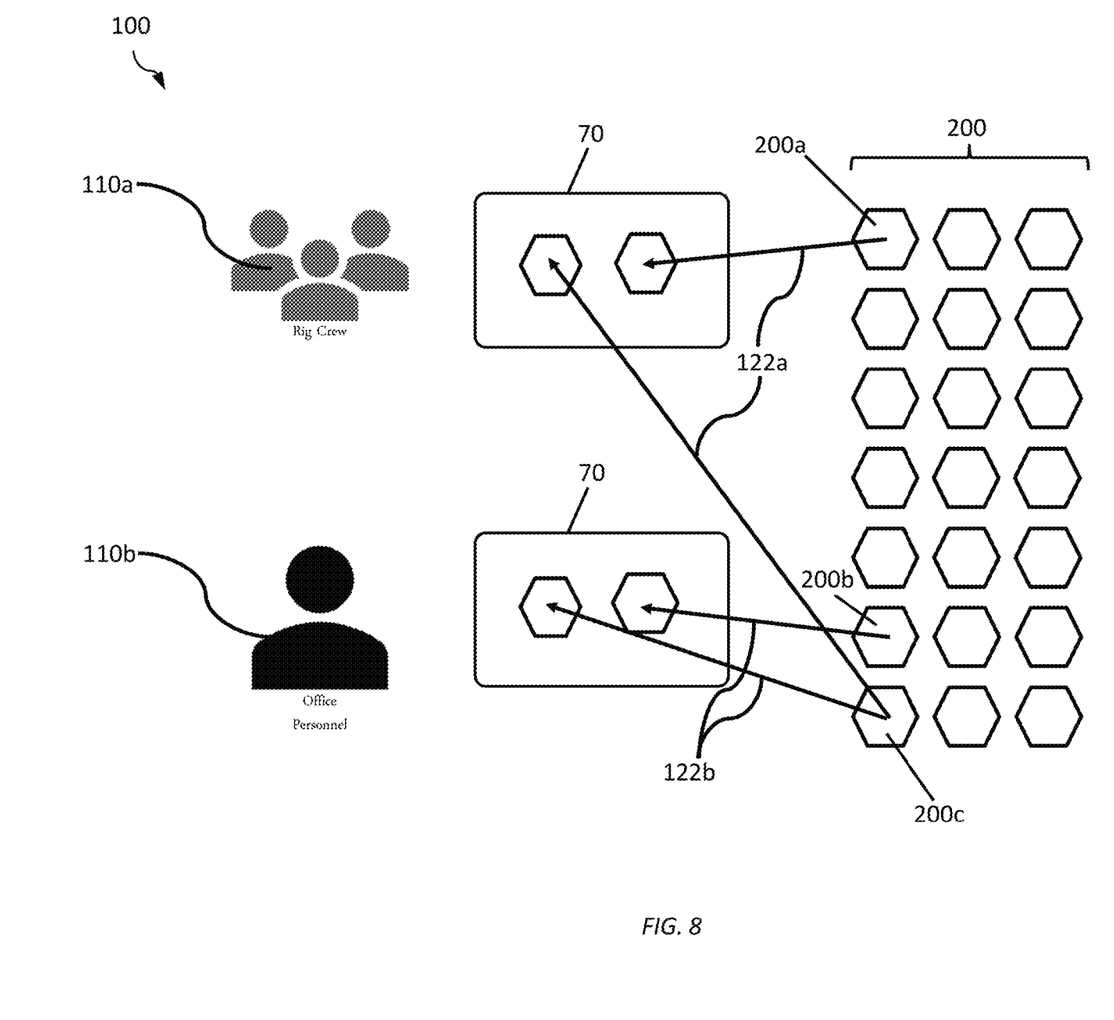
Figure 9:
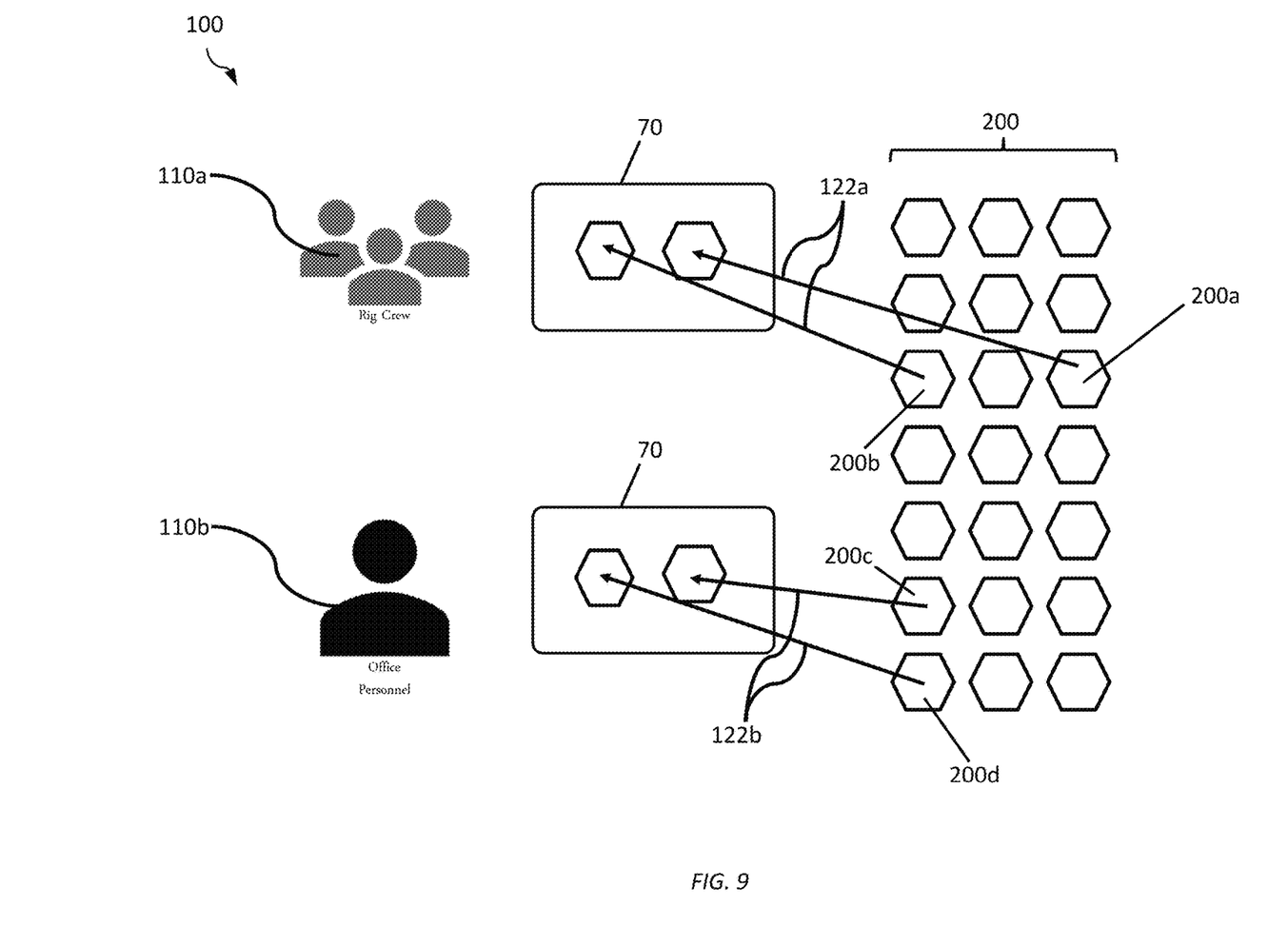

FIGS. 7-9 are graphical representations of a rig control system 100 that automatically updates visualization of rig information to a user 110*a*, 110*b* for subterranean operations, in accordance with certain embodiments.

FIG. 7 is representative of the functional diagram of FIG. 6 of the rig control system 100. When the wellbore is selected (manually or automatically), the rig control system 100 can determine the current rig operation for the desired wellbore based on operational data received from various data sources associated with the desired wellbore and rig. A rig can include multiple wellbores associated with that rig. Therefore, to select the desired wellbore, a user may also need to select a particular rig and then a particular wellbore on that rig. Based on that determination, the rig control system 100 can request 122 a pre-determined set of display elements 200 that are associated with the determined rig operation and configure the display 70 to visualize the selected display elements 200 on the display 70. This concept can be seen as an active push function (i.e., rig control system 100) instead of a passive request function (i.e., the rig control system 90). FIGS. 8-9 further illustrate the active push function of the rig control system 100. As used herein, "active push function" refers to a software program running on one or more processors or controllers, and based on the determined rig operation the software program "pushes" one or more display elements 200 to the display 70 to be seen by the user without further action by the user.

FIG. 8 shows that the pre-determined set of display elements 200 can be different for each user depending on the role the user plays in relation to the rig operations. For example, the rig crew 110*a* can have the display elements 200*a*, 200*c* shown on the rig crew display 70 for a particular rig operation, while the office personnel 110*b* can have the display elements 200*b*, 200*c* shown on the office personnel display 70 for the same rig operation. The rig control system 100 can comprise a set of possible display elements 200 that include the full complement of all available display elements 200 associated with rig operations. When a user logins and selects a particular wellbore to monitor, the rig controller 50 can detect the current rig operation being performed by the particular rig and push the pre-determined set of display elements 200 to the display 70, where the pre-determined set of display elements 200 is a sub-set of the available display elements 200.

FIG. 9 illustrates another pre-determined set of display elements 200 for each user depending on the role the user plays in relation to the rig operations. If the rig operation associated with FIG. 8 was drilling (or rotary drilling, or slide drilling, etc.) and the rig operation changed to another rig operation, then FIG. 9 can be seen as the new grouping of display elements 200 that can be pushed from the available display elements 200 to the displays 70 of the users 110*a*, 110*b* based on the new rig operation. In this example, the rig crew 110*a* can have the display elements 200*a*, 200*b* shown on the rig crew display 70 for the new rig operation, while the office personnel 110*b* can have the display elements 200*c*, 200*d* shown on the office personnel display 70 for the new rig operation.

Figure 10:
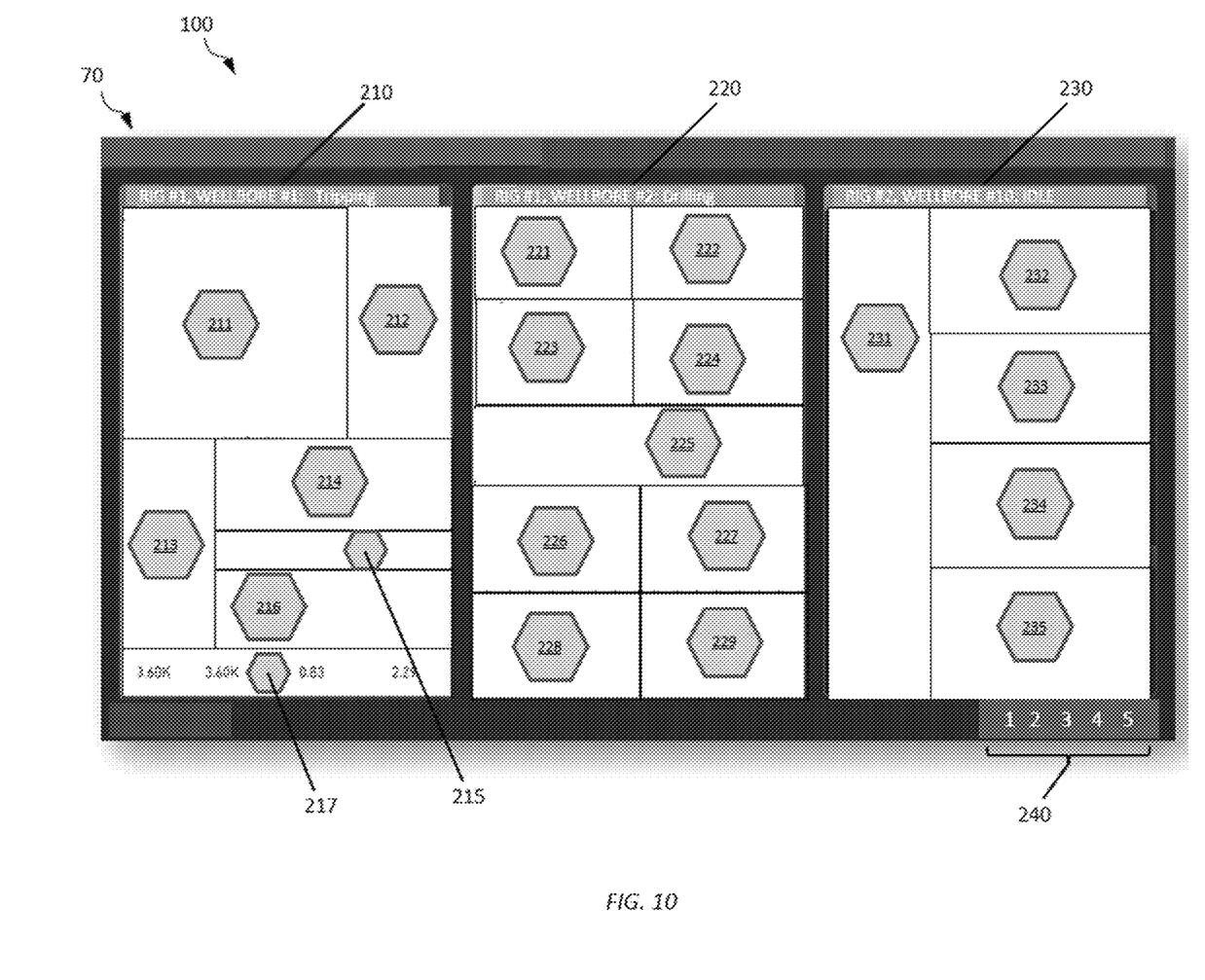
FIG. 10 is a representative view of display elements shown on a display that can be controlled by a rig control system that automatically updates visualization of rig information for subterranean operations, in accordance with certain embodiments

FIG. 10 is a representative view of display elements 200 shown on a display 70 that can be controlled by a rig control system 100 that automatically updates visualization of rig information for subterranean operations, in accordance with certain embodiments. The rig control system 100 can provide a high-level view of pertinent display elements 200 for each wellbore in a visualization for multiple wellbores. FIG. 10 illustrates three high-level views 210, 220, 230 for three wellbores (one on one rig and two on another rig). The three high-level views 210, 220, 230 for the wellbores can represent a subset of the wellbores being monitored by the rig control system 100. The subset can also be equal to the number of wellbores being monitored, such as when only one wellbore is being monitored, then only one high-level view may appear on the user display 70, and the one high-level view can also be referred to as a subset of the wellbores being monitored, even though there is only one wellbore being monitored. The top ribbon of the high-level view 210, 220, 230 can display the wellbore that is being monitored and its associated rig, as well as the current rig operation of the wellbore.

High-level view 210 can identify that the pre-determined set of display elements 211-217 being displayed in the high-level view 210 are associated with wellbore #1 on rig #1 and that the current rig operation is "TRIPPING." In this example, the display elements 211-217 can display the desired high-level information that would allow the user to quickly see if the current rig operation (i.e., tripping) is progressing as intended.

High-level view 220 can identify that the pre-determined set of display elements 221-229 being displayed in the high-level view 220 are associated with wellbore #2 on rig #1 and that the current rig operation is "DRILLING." In this example, the display elements 221-229 can display the desired high-level information that would allow the user to quickly see if the current rig operation (i.e., drilling) is progressing as intended.

High-level view 230 can identify that the pre-determined set of display elements 231-235 being displayed in the high-level view 230 are associated with wellbore #10 on rig

2 and that the current rig operation is "IDLE." In this example, the display elements 231-235 can display the desired high-level information regarding the wellbore that indicates the wellbore is still in idle mode and that the rig is planned to return to the wellbore for further operations, but it has not returned yet.

The rig control system 100 can automatically update one or more of the high-level views 210, 220, 230 to indicate that a new operation is being performed on the wellbore associated with the high-level view 210, 220, 230. Additionally, the rig control system 100 can also update the display 70 to show different wellbores 66 that may have higher priority activities in progress. For example, the high-level view 230 can be updated to show display elements for another wellbore altogether. If a wellbore #12 on a rig #3 (not shown) is beginning a drilling operation, this operation may be considered to be more important to show on the display 70 than the current wellbore #10 on the rig #2 being displayed in the high-level view 230. Therefore, the high-level view 230 can begin showing the display elements for rig #3, wellbore #12, and remove the display elements for rig #2, wellbore #10. In this case, the high-level view 230 can then display in the ribbon at the top "RIG #3, WELLBORE #122: DRILLING".

The display elements 231-235 can be replaced with those display elements (e.g., similar to RIG #1, WELLBORE #2 in high-level view 220) that are considered of most importance for a drilling operation. It is not required, but the user can be given an opportunity to delay the automatic update of the high-level views to another wellbore. If the user does not allow the switch to the new high-level view, then the rig control system 100 can display an alert to the user that another wellbore is performing an operation that is of higher priority than the one currently be viewed in the particular high-level view and provided the option to initiate the switch to the new wellbore when the user is ready to switch to the new wellbore information being displayed in the high-level view.

The rig control system 100 can display a page selection 240 that allows the user to quickly scan through high-level views of many other wellbores by navigating through the pages via the page selection 240. The rig control system 100 can continually update the rig operation and update the display elements 200 with new display elements, if appropriate, to ensure that the high-level views of the wellbores are always accurately depicting the current rig operation for that wellbore.

If the user elects to go past the high-level view to a more detailed view of display elements 200, the user can simply select one of the high-level views and navigate to a predetermined group of display elements 200 that are associated with the current rig operation for the selected wellbore.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

Embodiments

Embodiment 1. A method for conducting subterranean operations comprising:

collecting, via a processor, operational data about a subterranean operation being performed on a rig;

determining, via the processor, a type of the subterranean operation based on the operational data; and via the processor, automatically updating, based on the type, a user display with display elements associated with the subterranean operation.

Embodiment 2. The method of embodiment 1, wherein the type comprises drilling, casing, treating, tripping, producing, workover, plug & abandon, idle, released, and logging operations.

Embodiment 3. The system of embodiment 2, wherein the type comprises sub-operations to the operations.

Embodiment 4. The system of embodiment 3, wherein the sub-operations to the drilling operation comprise rotary drilling, slide drilling, vertical drilling, deviated drilling, rotary deviated drilling, slide drilling, and slide deviated drilling.

Embodiment 5. The method of embodiment 1, further comprising;

requesting input from the user to select whether to postpone or allow the automatically updating of the user display.

Embodiment 6. The method of embodiment 4, further comprising;

receiving the input from the user to select whether to postpone or allow the automatically updating of the user display.

Embodiment 7. A method for conducting subterranean operations comprising:

collecting, via a processor, operational data about subterranean operations being performed for one or more wellbores on one or more rigs;

determining, via the processor, a type of each of the subterranean operations based on the operational data; and automatically updating, based on the type of each of the subterranean operations, a user display with a high-level view of display elements for a subset of the one or more wellbores.

Embodiment 8. The method of embodiment 7, wherein each one of the high-level views can be automatically updated to show display elements for another wellbore when the another wellbore is performing an operation that is a higher priority than an operation being displayed in a current high-level view.

Embodiment 9. The method of embodiment 7, wherein the display elements being displayed in the high-level view are updated automatically to show other display elements to the user, wherein the other display elements have become more important to the operation of a wellbore associated with the high-level view.

Embodiment 10. A method for conducting subterranean operations comprising:

performing a rig control system as described in the description above.

Embodiment 11. A system for conducting subterranean operations comprising:

one or more processors configured to perform a method of the rig control system as described in the description above.

Embodiment 12. A method for conducting subterranean operations comprising:

collecting, via a processor, operational data about a first subterranean operation being performed on a wellbore of a rig;

determining, via the processor, a first type of the first subterranean operation based on the operational data; and automatically updating, based on the first type, a user display with a first set of display elements associated with the first type, the first set of display elements being selected from a set of available display elements.

Embodiment 13. The method of embodiment 12, wherein the first type of the first subterranean operation comprises a rig operation that is one of drilling, casing, treating, tripping, producing, workover, plug and abandon, idle, released, and logging operations.

Embodiment 14. The method of embodiment 13, wherein the rig operation comprises a sub-operation, and wherein the sub-operation for a drilling operation comprises one of rotary drilling, slide drilling, vertical drilling, deviated drilling, rotary deviated drilling, slide drilling, and slide deviated drilling.

Embodiment 15. The method of embodiment 12, further comprising; receiving, at the processor, an input from the user to select whether to postpone or allow automatically updating the user display.

Embodiment 16. The method of embodiment 12, further comprising:
 collecting, via the processor, operational data about a second subterranean operation being performed on the wellbore of the rig;
 determining, via the processor, a second type of the second subterranean operation based on the operational data, the second type being different than the first type; and
 via the processor, automatically updating, based on the second type, the user display with a second set of display elements associated with the second subterranean operation, the second set of display elements being selected from the set of available display elements.

Embodiment 17. The method of embodiment 16, wherein at least one display element in the second set of display elements is different than display elements in the first set of display elements.

Embodiment 18. The method of embodiment 12, further comprising:
 receiving input from a user; and
 based on the input, adjusting the first set of display elements by at least one of:
  adding, to the first set of display elements, at least one new display element selected from the set of available display elements, thereby adding the at least one new display element to the user display, and
  removing, from the first set of display elements, at least one display element of the first set of display elements, thereby removing the at least one display element from the user display.

Embodiment 19. The method of embodiment 18, wherein the next time the first type is determined, automatically updating, via the processor, the user display with the adjusted first set of display elements instead of the first set of display elements.

Embodiment 20. The method of embodiment 12, wherein the first set of display elements is associated with the first type of the first subterranean operation via user inputs received by the processor prior to when the first type of the first subterranean operation is performed, and the first set of display elements is stored in a non-transitory memory for later selection by the processor to update the user display when the first type is determined.

Embodiment 21. The method of embodiment 12, wherein the first set of display elements associated with the first type comprises display elements that are a subset of preferred display elements, and wherein the preferred display elements are configured to display preferred information for the first type, and the first set of display elements display a subset of the preferred information for the first type.

Embodiment 22. The method of embodiment 21, wherein the first set of display elements are automatically displayed as a high-level view for the first subterranean operation on a portion of the user display that identifies the first subterranean operation being performed and a wellbore on which the first subterranean operation is being performed.

Embodiment 23. The method of embodiment 22, further comprising:
 selecting the high-level view on the user display; and
 in response to the selecting, displaying, via the processor, the preferred display elements for the first type.

Embodiment 24. The method of embodiment 12, wherein each display element in the first set of display elements comprises a graphical user interface and an associated software program that manages displaying information via the graphical user interface on the user display.

Embodiment 25. The method of embodiment 12, wherein determining the first type further comprises determining a user type that indicates which type of user is to view the user display; and
 automatically updating, based on the user type and the first type, the user display with the first set of display elements associated with the first type of the first subterranean operation and the user type.

Embodiment 26. A method for conducting subterranean operations comprising:
 collecting, via a processor, operational data about subterranean operations being performed for a first wellbore on a first rig and a second wellbore on a second rig;
 based on the operational data, determining, via the processor, a first type of first subterranean operation being performed on the first wellbore and a second type of second subterranean operation being performed on the second wellbore; and
 automatically updating, based on the first type, a first portion of a user display with a first set of display elements that are configured to display a first high-level view of parameters for the first type;
 automatically updating, based on the second type, a second portion of the user display with a second set of display elements that are configured to display a second high-level view of parameters for the second type.

Embodiment 27. The method of embodiment 26, further comprising:
 automatically removing the second set of display elements from the user display; and
 automatically updating, based on a third type of a third subterranean operation on a third wellbore, the second portion of the user display with a third set of display elements that are configured to display a third high-level view of parameters for the third type.

Embodiment 28. The method of embodiment 27, wherein automatically updating the user display based on the third type is in response to the operational data indicating that the third type is a higher priority than the second type.

Embodiment 29. The method of embodiment 26, further comprising:
 selecting one of the first high-level view and the second high-level view on the user display, thereby choosing a selected high-level view; and
 in response to the selecting, removing, via the processor, the first high-level view and the second high-level view from the user display, and displaying preferred display elements of the first type if the first high-level view is selected, or displaying preferred display elements of the second type if the second high-level view is selected, wherein the preferred display elements display preferred information for a selected type, wherein the selected type is one of the first type or the second type and the selected type is the type of the selected high-level view.

Embodiment 30. The method of embodiment 26,
collecting, via the processor, operational data about a third subterranean operation being performed on the first wellbore of the first rig;
determining, via the processor, a third type of the third subterranean operation based on the operational data, the third type being different than the first type; and
automatically updating, based on the third type, the first portion of the user display with a third set of display elements associated with the third subterranean operation, the third set of display elements being selected from a set of available display elements.

Embodiment 31. The method of embodiment 26, wherein the first type further comprises a first user type, with the processor automatically updating the first portion of the user display based on the first type, and wherein the second type further comprises a second user type, with the processor automatically updating the second portion of the user display based on the second type.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method for conducting subterranean operations comprising:
    collecting, via a processor, operational data about a first subterranean operation being performed on a wellbore of a rig;
    determining, via the processor, a first type of the first subterranean operation based on the operational data;
    via the processor, automatically updating, based on the first type, a user display with a first set of display widgets associated with the first type, the first set of display widgets being selected from a set of available display widgets;
    collecting, via the processor, operational data about a second subterranean operation being performed on the wellbore of the rig;
    determining, via the processor, a second type of the second subterranean operation based on the operational data, the second type being different than the first type; and
    via the processor, automatically updating, based on the second type, the user display with a second set of display widgets associated with the second subterranean operation, the second set of display widgets being selected from the set of available display widgets.

2. The method of claim 1, wherein the first type of the first subterranean operation comprises a rig operation that is one of drilling, casing, treating, tripping, producing, workover, plug and abandon, idle, released, and logging operations.

3. The method of claim 2, wherein the rig operation comprises a sub-operation, and wherein the sub-operation for a drilling operation comprises one of rotary drilling, slide drilling, vertical drilling, deviated drilling, rotary deviated drilling, rotary slide drilling, deviated rotary drilling, slide drilling, and slide deviated drilling.

4. The method of claim 1, further comprising receiving, at the processor, an input from a user to select whether to postpone or allow automatically updating the user display.

5. The method of claim 1, wherein at least one display element in the second set of display widgets is different than display widgets in the first set of display widgets.

6. The method of claim 1, wherein the first set of display widgets is associated with the first type of the first subterranean operation via user inputs received by the processor prior to when the first type of the first subterranean operation is performed, and the first set of display widgets is stored in a non-transitory memory for later selection by the processor to update the user display when the first type is determined.

7. The method of claim 1, wherein the first set of display widgets associated with the first type comprises display widgets that are a subset of preferred display widgets, and wherein the preferred display widgets are configured to display preferred information for the first type, and the first set of display widgets display a subset of the preferred information for the first type.

8. The method of claim 1, wherein each display widget in the first set of display widgets comprises a graphical user interface and an associated software program that manages displaying information via the graphical user interface on the user display.

9. The method of claim 1, wherein determining the first type further comprises determining a user type that indicates which type of user is to view the user display; and
    automatically updating, based on the user type and the first type, the user display with the first set of display widgets associated with the first type of the first subterranean operation and the user type.

10. A method for conducting subterranean operations comprising:
    collecting, via a processor, operational data about a first subterranean operation being performed on a wellbore of a rig;
    determining, via the processor, a first type of the first subterranean operation based on the operational data;
    via the processor, automatically updating, based on the first type, a user display with a first set of display widgets associated with the first type, the first set of display widgets being selected from a set of available display widgets;
    receiving, at the processor, input from a user; and
    based on the input, adjusting, via the processor, the first set of display widgets by at least one of:
        adding, to the first set of display widgets, at least one new display element selected from the set of available display widgets, thereby adding the at least one new display element to the user display, and
        removing, from the first set of display widgets, at least one display element of the first set of display widgets, thereby removing the at least one display element from the user display.

11. The method of claim 10, wherein the next time the first type is determined, automatically updating, via the processor, the user display with the adjusted first set of display widgets instead of the first set of display widgets.

12. A method for conducting subterranean operations comprising:
    collecting, via a processor, operational data about a first subterranean operation being performed on a wellbore at a rig;

determining, via the processor, a first type of the first subterranean operation based on the operational data; and via the processor, automatically updating, based on the first type, a user display with a first set of display elements associated with the first type, the first set of display elements being selected from a set of available display elements, wherein the first set of display elements associated with the first type comprises display elements that are a subset of preferred display elements, wherein the preferred display elements are configured to display preferred information for the first type, and the first set of display elements display a subset of the preferred information for the first type, and wherein the first set of display elements are automatically displayed as a high-level view for the first subterranean operation on a portion of the user display that identifies the first subterranean operation being performed and the wellbore on which the first subterranean operation is being performed.

13. The method of claim 12, further comprising:
selecting the high-level view on the user display; and
in response to the selecting, displaying, via the processor, the preferred display elements for the first type.

14. A method for conducting subterranean operations comprising:
collecting, via a processor, operational data about a first subterranean operation being performed on a wellbore of a rig;
determining, via the processor, a first type of the first subterranean operation based on the operational data; and via the processor, automatically updating, based on the first type, a user display with a first set of display widgets associated with the first type, the first set of display widgets being selected from a set of available display widgets, wherein the first subterranean operation comprises a plurality of subterranean operations with each of the plurality of subterranean operations being performed on a respective one of a plurality of wellbores on a respective one of a plurality of rigs, the method further comprising:

collecting, via the processor, operational data about each of the plurality of subterranean operations;

determining, via the processor, a type of each of the subterranean operations based on the operational data; and automatically updating, based on the type of each of the subterranean operations, a user display with a high-level view of display widgets for a subset of the plurality of wellbores.

15. The method of claim 14, wherein each one of the high-level views can be automatically updated to show display widgets for another wellbore when the other wellbore is performing an operation that is a higher priority than an operation being displayed in a current high-level view.

16. The method of claim 15, wherein the display widgets being displayed in the high-level view are updated automatically to show other display widgets to the user, wherein the other display widgets have become more important to the operation of a wellbore associated with the high-level view.

* * * * *